(12) United States Patent
Ishii et al.

(10) Patent No.: US 8,150,670 B2
(45) Date of Patent: Apr. 3, 2012

(54) SIMULATOR AND SIMULATION METHOD

(75) Inventors: Shogo Ishii, Tokyo (JP); Toshiyuki Ohno, Tokyo (JP)

(73) Assignees: Kabushiki Kaisha Toshiba, Tokyo (JP); Toshiba Solutions Corporation, Tokyo (JP)

( * ) Notice: Subject to any disclaimer, the term of this patent is extended or adjusted under 35 U.S.C. 154(b) by 596 days.

(21) Appl. No.: 12/111,592

(22) Filed: Apr. 29, 2008

(65) Prior Publication Data
US 2008/0288233 A1 Nov. 20, 2008

(30) Foreign Application Priority Data
May 14, 2007 (JP) ................................. 2007-127922

(51) Int. Cl.
G06F 11/22 (2006.01)
G06F 17/50 (2006.01)

(52) U.S. Cl. .................. 703/13; 703/2; 703/21; 703/24; 703/25; 710/22; 710/317; 716/106; 714/30

(58) Field of Classification Search .................. 703/24, 703/25, 2, 13, 21; 714/30; 710/100, 260, 710/22; 716/106
See application file for complete search history.

(56) References Cited

U.S. PATENT DOCUMENTS

| | | | | |
|---|---|---|---|---|
| 5,768,567 A * | 6/1998 | Klein et al. | ...................... | 703/13 |
| 5,771,370 A * | 6/1998 | Klein | ............................... | 703/13 |
| 5,809,309 A * | 9/1998 | Leach et al. | ................... | 710/260 |
| 6,134,516 A | 10/2000 | Wang et al. | | |
| 6,381,565 B1 | 4/2002 | Nakamura | | |
| 6,539,497 B2 * | 3/2003 | Swoboda et al. | ............... | 714/30 |
| 6,546,505 B1 * | 4/2003 | Swoboda et al. | ............... | 714/30 |
| 6,754,763 B2 * | 6/2004 | Lin | ............................... | 710/317 |
| 6,941,538 B2 * | 9/2005 | Hwang et al. | ................. | 716/102 |
| 7,512,728 B2 * | 3/2009 | Tseng | ............................ | 710/100 |
| 2002/0052729 A1 | 5/2002 | Kyung et al. | | |
| 2003/0105617 A1 | 6/2003 | Cadambi et al. | | |
| 2004/0031003 A1 * | 2/2004 | Hiquchi et al. | ................... | 716/7 |
| 2005/0114113 A1 * | 5/2005 | Quayle et al. | ................... | 703/25 |
| 2005/0177656 A1 * | 8/2005 | Hwang et al. | ................... | 710/22 |
| 2007/0143091 A1 * | 6/2007 | Hiquchi et al. | ................. | 703/21 |
| 2008/0281576 A1 * | 11/2008 | Ohno et al. | ..................... | 703/21 |

FOREIGN PATENT DOCUMENTS

| | | |
|---|---|---|
| JP | 2000-132420 | 5/2000 |
| JP | 2002-189611 | 7/2002 |
| JP | 2003223476 | 8/2003 |
| JP | 2004-252824 | 9/2004 |

OTHER PUBLICATIONS

Chinese Office Action dated Sep. 18, 2009 corresponding to U.S. Appl. No. 12/111,592, filed Apr. 29, 2008.
Ren Yu, Wan Jian, Software Simulator of Embedded Application System, 1994-2009 China Academic Journal Electronic Publishing House, Jul. 2004, vol. 24, No. 7, pp. 144-146.
Chinese Office Action dated Apr. 14, 2010 corresponding to U.S. Appl. No. 12/111,592, filed Apr. 29, 2008.
Japanese Office Action for Application No. 2007-127922 mailed on Aug. 30, 2011.

* cited by examiner

*Primary Examiner* — Thai Phan
(74) *Attorney, Agent, or Firm* — Turocy & Watson, LLP

(57) ABSTRACT

An object of the present invention is to provide a simulator for verifying plural products with common hardware configuration, in which peripheral hardware that can be reused are constituted by hardware and other peripheral hardware is constituted by software simulator, and simulation method.

A simulator comprises: a hardware section that includes a peripheral hardware configuration with a structure required for a CPU and OS to operate alone; a software section that simulates the operation of peripheral hardware other than hardware constituting the hardware section as a peripheral hardware model; and an interface board that connects the hardware section and software section.

11 Claims, 3 Drawing Sheets

FIG. 2

FUNCTION ASSIGNMENT OF REGISTER
1. PROFILE DATA REGISTER                              ADDRESS NUMBER 100
2. TRANSFER SOURCE ADDRESS/SIZE REGISTER              ADDRESS NUMBER 104
3. TRANSFER DESTINATION ADDRESS/SIZE REGISTER         ADDRESS NUMBER 108
4. CONTROL REGISTER                                   ADDRESS NUMBER 10C
5. OPERATION STATUS REGISTER                          ADDRESS NUMBER 110

CORRESPONDENCE BETWEEN REGISTERS
INTERRUPTION EVENT GENERATING REGISTER               ADDRESS NUMBER 10 C ~ ADDRESS NUMBER 10 F
INTERRUPTION/WAIT EVENT GENERATING REGISTER          ADDRESS NUMBER 110 ~ ADDRESS NUMBER 113

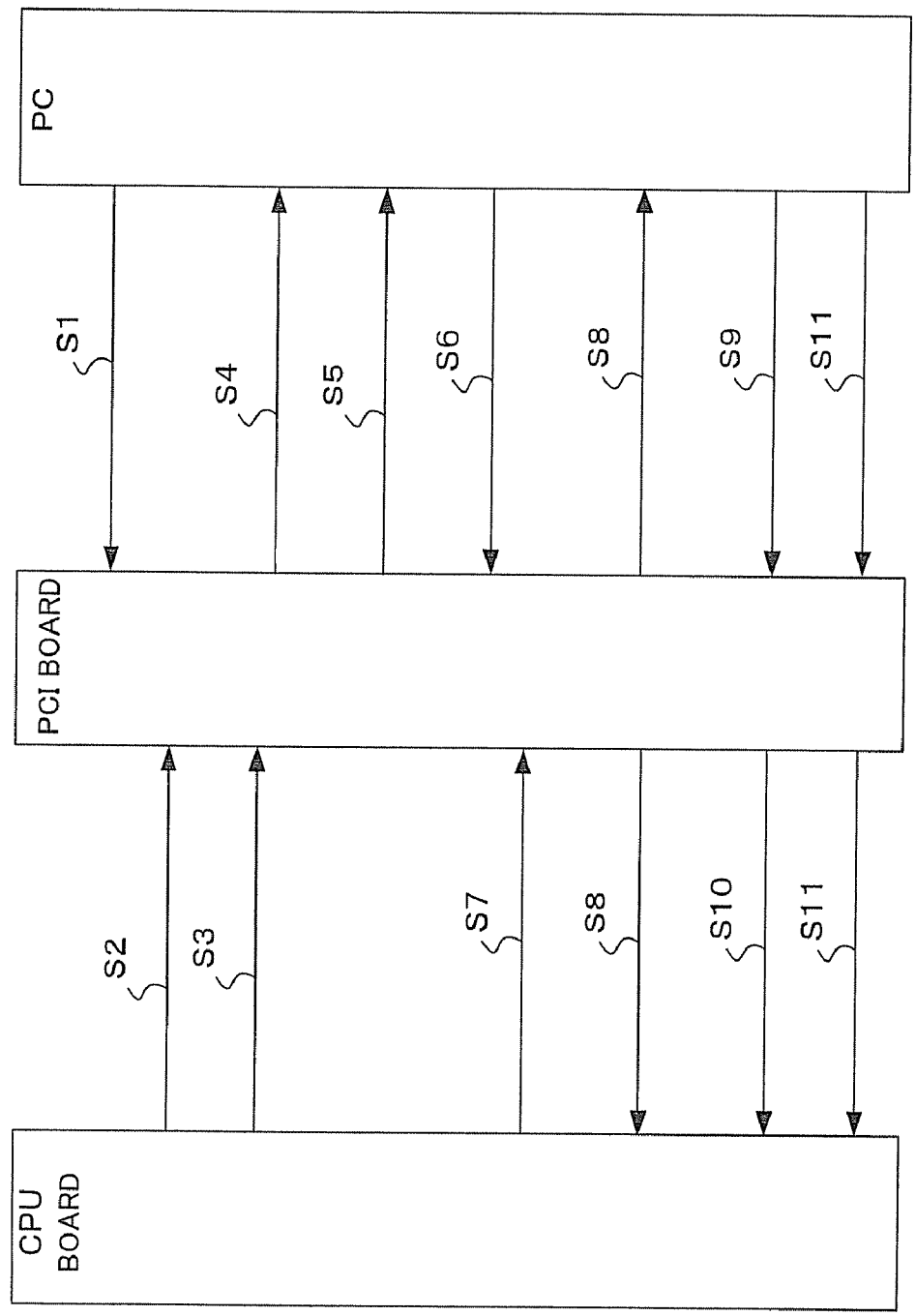

SIMULATOR AND SIMULATION METHOD

BACKGROUND OF THE INVENTION

1. Field of the Invention

The present invention relates to a simulator and simulation method for verifying plural products with common hardware configuration and, more particularly, to a simulator in which peripheral hardware that can be reused are constituted by hardware and other peripheral hardware is constituted by software simulator.

2. Description of the Related Art

In verifying the operation of a target product to be marketed, it is desirable to product the target product itself and verify it. However, in terms of production cost and product man-hour, the operation verification is often made using a simulator of the target product. In order to perform the verification of the operation of a target product at low cost, there is known a simulator constituted by a hardware emulator for emulating part of hardware configuration of the target product and a software simulator for simulating other hardware configuration of the target product.

Further, there is known a hardware acceleration system that writes hardware logic to be simulated into an FPGA (Field Programmable Gate Array) so as to allow the hardware logic to be executed on the FPGA (refer to, e.g., Patent Document 1: Jpn. Pat. Appln. Laid-Open Publication No. 2003-223476).

However, in the simulator constituted by the hardware emulator and software simulator, the hardware emulator needs to be changed whenever the hardware configuration of a target product is changed, so that the hardware emulator cannot be reused and therefore effective low cost goal cannot be achieved.

Further, also in the hardware acceleration system of Patent Document 1, all hardware logic in the hardware configuration thereof need to be written into the FPGA whenever the hardware configuration of a target product is changed.

SUMMARY OF THE INVENTION

The present invention has been made to solve the above problems and an object thereof is to provide a simulator for verifying plural products with common hardware configuration, in which peripheral hardware that can be reused are constituted by hardware and other peripheral hardware is constituted by software simulator, and simulation method.

To solve the above problems, according to an aspect of the present invention, there is provided a simulator including: a hardware section that includes a peripheral hardware configuration with a structure required for a CPU and OS to operate alone; a software section that simulates the operation of peripheral hardware other than hardware constituting the hardware section as a peripheral hardware model; and an interface board that connects the hardware section and software section.

In the above simulator, the interface board is connected via a PCI bus to the software section.

Further, in the above simulator, the interface board is connected via a bus to the hardware section.

Further, to solve the above problems, according to another aspect of the present invention, there is provided a simulation method performing simulation by connecting: a hardware section that includes a peripheral hardware configuration with a structure required for a CPU and OS to operate alone; and a software section that simulates the operation of peripheral hardware other than hardware constituting the hardware section as a peripheral hardware model via an interface board.

Further, in the above simulation method, the interface board is connected via a PCI bus to the software section.

Further, in the above simulation method, the interface board is connected via a bus to the hardware section.

According to the present invention, by constituting peripheral hardware that can be reused by hardware and constituting other peripheral hardware by software simulator for verifying plural products with common hardware configuration, thereby performing simulation at low cost.

BRIEF DESCRIPTION OF THE DRAWINGS

FIG. 2 is a view showing assigned function of registers and correspondence between registers; and FIG. 3 is a view showing a processing sequence in the embodiment of the present invention.

DETAILED DESCRIPTION OF THE PREFERRED EMBODIMENTS

Figure 1:
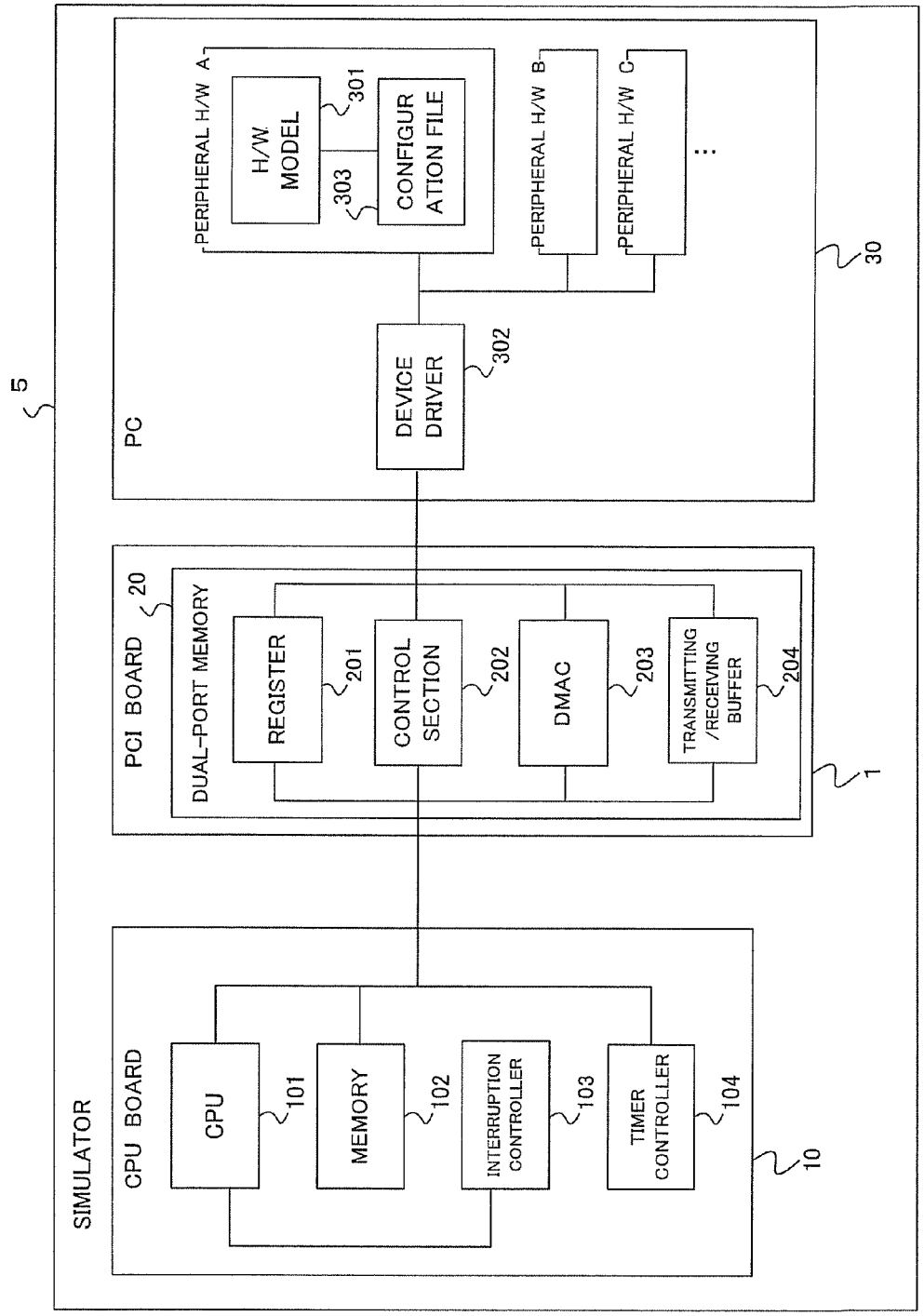
FIG. 1 is a view showing a configuration of a simulator in an embodiment of the present invention.

An embodiment of the present invention will be described below with reference to the accompanying drawings. The present embodiment assumes a simulator that applies JPEG compression to uncompressed image data.

A configuration diagram of the simulator according to the present embodiment is shown in FIG. 1.

A simulator 5 includes a CPU board 10 (hardware section), a PCI board 20 serving as an interface board, and a PC 30 (PC: Personal Computer (software section)) serving as a peripheral hardware simulator for simulating the operation of peripheral hardware.

The CPU board 10 is a board provided at least with a CPU on a printed-circuit board. The CPU board in the present embodiment includes, as a minimal configuration, a CPU 101, a memory 102 (RAM, ROM), a timer controller 104 for performing time management, an interruption controller 103 for generating an interruption request signal to the CPU 101, a PLL which is a phase synchronization circuit, and an RSET which is a reset circuit.

The PCI board 1 is an interface board for connecting the CPU board and PC 30 so as to serve as an intermediate buffer therebetween. The PCI board 1 includes a dual-port memory 20 accessible from both the CPU board 10 and PC 30. The dual-port memory 20 includes a register 201, a control circuit 202, a DMAC 203, and a transmitting/receiving buffer 204.

The PC 30 includes a peripheral hardware model 301 (represented as "H/W model" in FIG. 1) and configuration file 303 for applying JPEG compression to image data, the set (represented as "peripheral H/W A, peripheral H/W B, . . . " in FIG. 1) of which is simulated as peripheral hardware. The PC 30 further includes a device driver 302 that controls input/output of data of all the simulated hardware and operation of the PCI board 20.

The register 201 in the present embodiment functions both as an interruption event generating register and an interruption/WAIT event generating register. In the following, the operation performed in the case when the functions of the register are accessed will be described.

When an access is made to an address within a predetermined address range to which the function as the interruption event generating register 201 is assigned, the PCI board 1 notifies the peripheral hardware model 301 of generation of an interruption. The initial value of a value set in the address range to which the function as the interruption event generating register is assigned is set to 0, which represents that no interruption is generated.

When an access is made to an address within a predetermined address range to which the function as the interruption/WAIT event generating register of the register 201 is assigned, the PCI board 1 notifies the peripheral hardware model 301 of generation of an interruption. At the same time, the CPU 101 is put in a "WAIT" state until an instruction of the release of the WAIT mode is issued from the peripheral hardware model 301. The initial value of a value set in the address range to which the function as the interruption/WAIT event generating register is assigned is set to 0, which represents that no interruption and no "WAIT" are generated.

The function assignment of the register 201 for performing JPEG compression processing in the present embodiment is shown in FIG. 2.

A profile data register, a transfer source address/size register, and transfer destination address/size register store configuration information for performing the JPEG compression processing, which is sent from the CPU 101 to the peripheral hardware model 301. In the present embodiment, JPEG compression rate data is stored in the profile data register.

The control register is a register for controlling JPEG compression processing such as starting conversion operation. An operation status register is a register for storing the processing state of the peripheral hardware model 301, such as processing state during operation and conversion error.

As shown in the "function assignment of register" of FIG. 2, in the present embodiment, the start address of the profile data register is "100", and the start addresses of the transfer source address/size register and transfer destination address/size register are "104" and "108", respectively. The start address of the control register is "10C", and that of the operation status register is "110".

Further, as shown in "correspondence between registers", the interruption event generating register is assigned to "10C" to "10F", and interruption/WAIT event generating register is assigned to "110" to "113". As a result, when the control register (whose starting address is "10C") is accessed, an interruption event is generated for the peripheral hardware model 301; while when the operation status register (whose starting address is "110") is accessed, an interruption event is generated for the peripheral hardware model 301, as well as a WAIT event is generated for the CPU 101.

The JPEG compression processing in the present embodiment will next be described with reference to FIG. 3.

First, the PCI board 1 previously loads information of the configuration file 303 into the control section 202 (step S1). The configuration file 303 stores the information shown in FIG. 2.

The CPU board 10 sets profile data, transfer source address, and transfer destination address in the profile data register, transfer source address/size register, and transfer destination address/size register of the register 201 (step S2).

In order to cause the peripheral hardware model 301 to start the JPEG conversion, the CPU 101 sets a value for starting the JPEG conversion in the control register of the register 201 (step S3).

Since an access has been made from the CPU 101 to the control register assigned as the interruption event generating register, the PCI board 1 issues an interruption notification to the peripheral hardware model 301 via the device driver 302 (step S4).

Upon reception of the interruption notification, the peripheral hardware model 301 confirms the content set in the control register of the register 201. When the data indicates a value for starting the JPEG conversion, the peripheral hardware model 301 reads out the profile data, transfer source address/size, and transfer destination address/size from the profile data register, transfer source address/size register, and transfer destination address/size register of the register 201 (step S5).

Thereafter, the peripheral hardware model 301 issues a DMA (Direct Memory Access) request to the DMAC (Direct Memory Access Controller) 203 of the PCI board 1. Upon receiving the request, the DMAC 203 loads uncompressed image data from the memory 102 of the CPU board 10 via the transmitting/receiving buffer of the PCI board 1 into a memory on the PC 30 where the peripheral hardware model 301 performs the JPEG compression processing.

The peripheral hardware model 301 then starts a compression operation and sets the previously assigned value in the operation status register of the register 201 (step S6).

As a value to be written in the operation status register, a value indicating whether or not the current processing needs to be synchronized with the CPU 101 is previously provided in addition to a value indicating the processing state (processing state during operation and conversion error, etc.) of the peripheral hardware model 301. In step S6, a value indicating the current processing needs to be synchronized with the CPU 101 is assumed to be set.

In order to read out the operation status, the CPU 101 accesses the operation status register of the register 201 (step S7).

Since an access has been made to the operation status register assigned to the interruption/WAIT event generating register and value indicating that synchronization is required has been set, the PCI board 1 issues an interruption notification to the peripheral hardware model 301 via the device driver 302 and causes the CPU 101 to enter the WAIT state (step S8).

After the processing that needs to be synchronized with the CPU 101 has been completed, the peripheral hardware model 301 writes the operation status (value indicating that synchronization with the CPU 101 is not required) in the operation status register and issues a WAIT release command (step S9).

Upon reception of the WAIT release command, the PCI board 1 performs the release of the WAIT state for the CPU 101 (step S10). The CPU 101 releases the WAIT sate based on the WAIT release command issued from the peripheral hardware model 301 and starts reading out the operation status that the peripheral hardware model 301 has written.

The release of the WAIT state of the CPU 101 by the PCI board 1 may be performed as follows: a WAIT release register is additionally provided in the register 201, and the WAIT release command issued from the peripheral hardware model 301 accesses the WAIT release register.

After completion of the JPEG compression operation, the peripheral hardware model 301 reads out the abovementioned transfer destination address/size and issues a DMA request to the DMAC 203 of the PCI board 1. Upon reception of the DMA request, the DMAC 203 loads JPEG compressed image data from a memory on the PC 30 where the peripheral hardware model 301 performs the JPEG compression processing via the transmitting/receiving buffer of the PCI board 1 into the memory 102 of the CPU board 10.

The peripheral hardware model 301 writes operation status (value indicating that synchronization with the CPU 101 is not required) indicating that operation has normally been completed in the operation status register of the register 201 and issues an interruption request command to the CPU 101 (step S11).

A configuration may be adopted in which the memory area of the dual-port memory 20 is divided into a plurality of areas for each peripheral hardware (peripheral H/W A, peripheral H/W B, . . . ) operating on the PC 30, and the WAIT instruction for the CPU 101 and interruption notification for the peripheral hardware model are issued in units of each divided area. With this configuration, it is possible to establish synchronization between a plurality of peripheral hardware and CPU 101, thereby enabling a target product including a plurality of peripheral hardware to be verified in a comprehensive manner.

As described above, by allowing the hardware and hardware model to cooperate with each other through an interface, in a simulator for verifying plural products with common hardware configuration, peripheral hardware that can be reused can be constituted by hardware and other peripheral hardware can be constituted by software simulation, whereby cost and labor hour savings can be realized.

What is claimed is:

1. A simulator comprising:
   a hardware section that includes a peripheral hardware configuration with a structure required for a central processing unit and an operating system to operate alone;
   a software section that simulates the operation of peripheral hardware, other than hardware constituting the hardware section, as a peripheral hardware model; and
   an interface board that connects the hardware section and software section,
   wherein the interface board includes a register that acts as at least one of: an interruption event generation register that notifies the peripheral hardware model of generation of an interruption when an access is made to an address within a predetermined address range, or an interruption/wait event generating register that notifies the peripheral hardware model of generation of an interruption and puts the hardware section in a wait state until an instruction of the release of the wait state is issued from the peripheral hardware model.

2. The simulator according to claim 1, wherein the interface board is connected to the software section via at least one of a Peripheral Component Interconnect board or a bus.

3. The simulator according to claim 1, wherein the interface board is connected via a bus to the hardware section.

4. The simulator according to claim 1, wherein the peripheral hardware configuration of the hardware section is reuseable for verifying plural target products with common hardware configuration.

5. The simulator of claim 1, wherein the software section includes a configuration file for applying image compression to a set of image data.

6. The simulator of claim 1, wherein the software section includes a device driver that controls input/output data of all simulated hardware and operation of the interface board.

7. A simulation method, comprising:
   obtaining profile data, transfer source address data, and transfer destination address data from a hardware section, obtaining a signal from the hardware section to start a simulation via a peripheral hardware model included in a software section;
   obtaining confirmation from the peripheral hardware model of the signal to start the simulation and transferring the profile data, transfer source address data, and transfer destination address data to the peripheral hardware model;
   loading data from a memory of the hardware section to a memory of the software section;
   obtaining an operation status value from the peripheral hardware model; and
   processing simulation data from the peripheral hardware model via a transmitting/receiving buffer into the memory of the hardware section upon completion of the simulation.

8. The method of claim 7, wherein the operation status value indicates at least one of a processing state, a conversion error, or whether processing of the simulation data is to be synchronized with the hardware section.

9. The method of claim 7, further comprising loading configuration file data into a control section, wherein the configuration file data includes a function assignment of at least one of a profile data register, a transfer source address/size register, a transfer destination address/size register, a control register, or an operation status register.

10. The method of claim 7, further comprising writing to a register that acts as at least one of: an interruption event generation register that notifies the peripheral hardware model of generation of an interruption when an access is made to an address within a predetermined address range, or an interruption/wait event generating register that notifies the peripheral hardware model of generation of an interruption and puts the hardware section in a wait state until an instruction of the release of the wait state is issued from the peripheral hardware model.

11. The method of claim 7, wherein the simulation includes performing image compression on uncompressed image data loaded from the memory of the hardware section.

* * * * *